(12) United States Patent
Lamm et al.

(10) Patent No.: US 10,924,705 B1
(45) Date of Patent: Feb. 16, 2021

(54) SERRATED PRISM EXIT APERTURE FOR MANAGING PROJECTION FLARE ARTIFACTS

(71) Applicant: CHRISTIE DIGITAL SYSTEMS USA, INC., Cypress, CA (US)

(72) Inventors: Mark Lamm, Mississauga (CA); Joseph Ma, Waterloo (CA)

(73) Assignee: CHRISTIE DIGITAL SYSTEMS USA, INC.

( * ) Notice: Subject to any disclaimer, the term of this patent is extended or adjusted under 35 U.S.C. 154(b) by 0 days.

(21) Appl. No.: 16/731,599

(22) Filed: Dec. 31, 2019

(51) Int. Cl.
  *G03B 21/14* (2006.01)
  *H04N 5/74* (2006.01)
  *G02B 26/08* (2006.01)
  *G02B 5/04* (2006.01)

(52) U.S. Cl.
  CPC ....... *H04N 5/7458* (2013.01); *G02B 26/0833* (2013.01); *G03B 21/142* (2013.01); *G02B 5/04* (2013.01)

(58) Field of Classification Search
  CPC ............................... G03B 21/14; G03B 21/142
  USPC ............................................................ 353/98
  See application file for complete search history.

(56) References Cited

U.S. PATENT DOCUMENTS

| 4,305,650 | A | * | 12/1981 | Knox | ................ | G03B 27/542 |
| | | | | | | 355/71 |
| 5,119,113 | A | * | 6/1992 | Prakash | ................ | B41J 2/465 |
| | | | | | | 250/215 |
| 7,651,283 | B2 | | 1/2010 | Saito et al. | | |
| 9,759,847 | B2 | | 9/2017 | Matsuo et al. | | |
| 10,012,892 | B2 | | 7/2018 | Harris | | |
| 2007/0154207 | A1 | | 7/2007 | Saito et al. | | |

FOREIGN PATENT DOCUMENTS

| CN | 102540287 A | 7/2012 |
| JP | 2006133442 A | 5/2006 |
| WO | 2017/047517 A1 | 3/2017 |

\* cited by examiner

*Primary Examiner* — William C. Dowling
(74) *Attorney, Agent, or Firm* — Perry + Currier

(57) ABSTRACT

An exit aperture is set forth for placement between a prism and a projection lens capable of projecting light on a screen, comprising a frame with an opening for passing a cone of light and mounting points for securing the frame relative to the projection lens, wherein the opening has serrated edges for diffracting light incident thereon in multiple directions perpendicular to the serrated edges so as to be imperceptible when projected on the screen.

3 Claims, 5 Drawing Sheets
(1 of 5 Drawing Sheet(s) Filed in Color)

SERRATED PRISM EXIT APERTURE FOR MANAGING PROJECTION FLARE ARTIFACTS

BACKGROUND OF THE INVENTION

1. Field of the Invention

The present invention is directed to projection systems, and more particularly to an apparatus for reducing flare artifacts in a projection system, such as a color digital projector.

2. Description of the Related Art

A typical color digital projector comprises an illumination source, an illumination collection and relay system and a color splitting-recombining prism supporting one or more imaging devices. The imaging device can be a digital micromirror device (DMD) panel that receives a light cone from the illumination collection and relay system and modulates the light to create an image on a screen.

The DMD is an electromechanical device comprising millions of microscopic mirrors that modulate light by independently flipping each mirror either to an 'on' state or to an 'off' state. In a 3-chip system, three such DMDs on the prism modulate red, green and blue individually and the colors are then recombined by the prism.

Improvements in the design of such systems, such as reduced size and weight, have led to the use of compact prisms, resulting in several prism intersections located near the optical path of the light cone. Such compact projection systems have been found to be vulnerable to undesired artifacts outside the main projected cone of light, referred to as 'flare', which occur when projected light strikes a feature in the optical path and is diffracted perpendicular to the feature.

One known solution to the problem of flare is to add an exit aperture to block the undesired artifacts. However, such apertures can themselves result in flare artifacts where the aperture edges encroach on the main projected cone of light.

The following references are believed to be relevant to this disclosure: US2007154207A1; U.S. Pat. Nos. 7,651,283B2; 9,759,847B2; JP2006133442A; CN102540287A; U.S. Pat. No. 10,012,892B2 and WO2017047517A1.

SUMMARY OF THE INVENTION

It is an aspect of the present invention to provide a compact projection system with an exit aperture that blocks prism-intersection flare without adding flare of its own.

In one aspect, an aperture is provided with a serrated inner circumference that causes light to diffract in different directions thereby reducing the visibility of incidental light or "flare" in the projected image.

The above aspects can be attained by an exit aperture for placement between a prism and a projection lens capable of projecting light on a screen. The exit aperture comprises a frame with an opening for passing a cone of light and mounting points for securing the frame relative to the projection lens. The opening preferably has serrated edges for diffracting light incident thereon in multiple directions perpendicular to the serrated edges so as to be imperceptible when projected on the screen.

In another aspect, the opening is generally rectangular.
In another aspect, the serrated edges are notched.
In another aspect, the serrated edges are triangular.
In another aspect, the serrated edges are denticulate.
In another aspect, the serrated edges are serriform.
In another aspect, the serrated edges are serrulate.
In another aspect, the serrated edges are toothed.
In another aspect, the frame is opaque for blocking stray light.
In another aspect, the frame is fabricated from sheet metal.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

Also, as used in this specification, "serrated" means having an edge that is triangular, sawtooth-shaped, ragged, denticulate, serriform, serrulate, toothed or otherwise notched.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1:
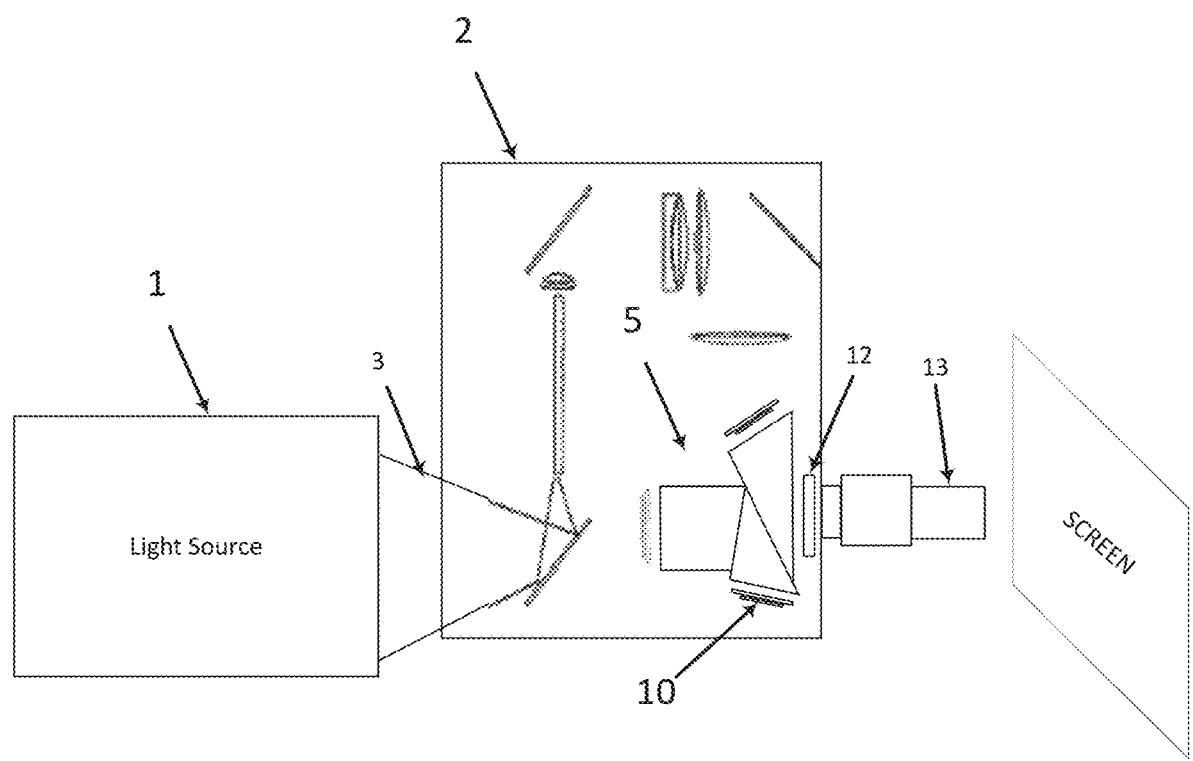
FIG. 1 is a color digital projector, according to the prior art.
Figure 2:
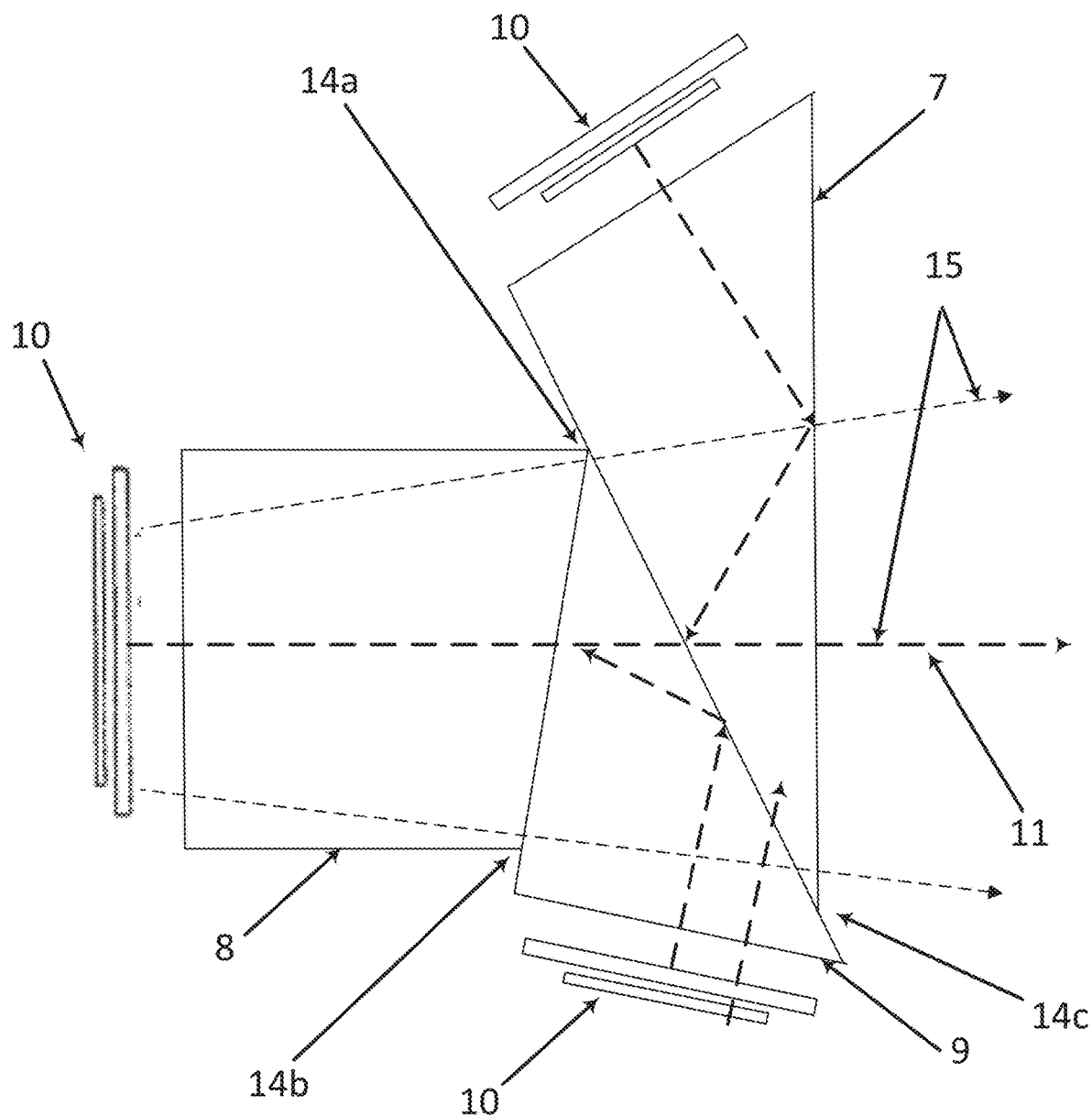
FIG. 2 is a schematic representation of a color splitting-converging prism used for DMD panel display devices, according to the prior art.

FIG. 1 shows a typical '3-chip' color digital projector comprising a light source (1) for directing a light cone (3) into an illumination collection and relay system (2), including an integrator rod and lenses for telecentric illumination. A color combining prism (5) is shown in FIG. 2. The prism (5) enables modulation of red, green and blue separately at each display device or light valve (10), such as by a DMD. The terms "display device" and "light valve" are used interchangeably throughout this disclosure. The display devices reflect the modulated light, which is re-converged by the prism, passes through an exit aperture (12), and projected by a projection lens (13) onto a screen to produce an image. In the three-chip design, convergence mechanisms are placed on the display devices to assist in field alignment to address any mis-convergence of color.

It will be noted that three prism elements (7), (8) and (9) intersect at (14a), while elements (9) and (8) intersect at (14b) and elements (7) and (9) intersect at (14c). Also shown in FIG. 2, is a schematic representation of the ideal path of the projected green light (15). It will be noted that scattering of the projected green light (15) will result in illuminating the prism intersections (14a), (14b) and (14c), causing flare.

In particular, the optical element edges that form intersections (14a), (14b) and (14c) cause light wave diffraction in the manner of a slit, in accordance with the Huygens-Fresnel principle, resulting light being scattered perpendicular to the edges of the slit (i.e. the optical element edges that form intersections (14a), (14b) and (14c)).

Figure 3:
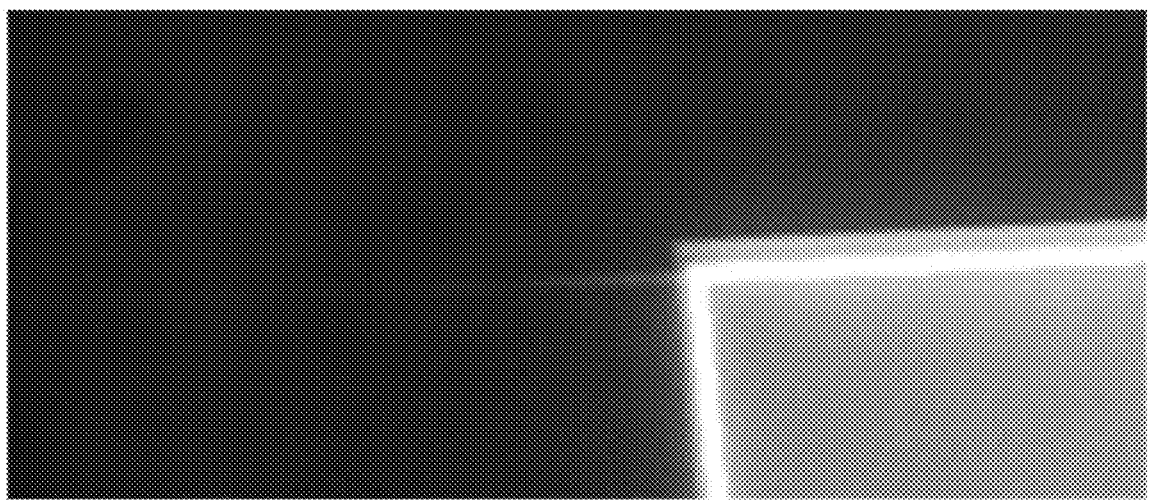
FIG. 3 shows an example of horizontal flare extending to the left of a projected image, caused by prism intersections located near the optical path of the cone of light.

FIG. 3 shows an example of horizontal flare extending to the left of a projected image, caused by the intersection (14b).

It is known in the prior art to position the exit aperture (12), as shown in FIG. 1, so as to block un-desired artifacts from scattered light outside the main projected cone of light, however, the straight edges of a traditional prior art exit aperture function as a half-slit, which can also give rise to flare artifacts, as discussed below.

Figure 4:
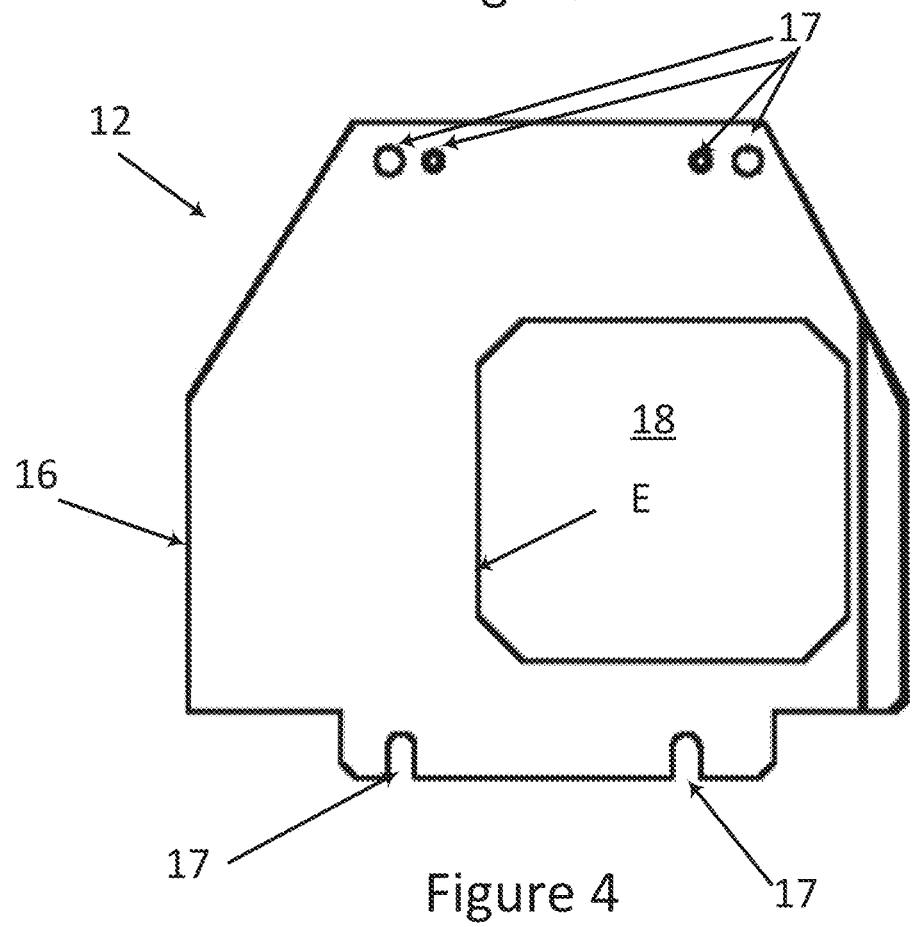
FIG. 4 depicts a prior art straight-edge exit aperture used in the color digital projector of FIG. 1.

FIG. 4 depicts a prior art straight-edge exit aperture (12) for preventing stray/high-angle light from creating artifacts in the image. The exit aperture (12) comprises a frame (16) with a plurality of mounting points (17) for mounting the frame in a fixed position relative to the prism (13). The frame (16) is preferably opaque. The frame (16) can, for example, be fabricated from sheet metal. A generally rectangular opening (18) is provided through which the cone of light (11) passes and is projected onto the screen. Stray light due to diffraction occurring at the prism edges at intersections (14a), (14b) and (14c) is blocked by the edges (E), to eliminate flare.

However, in the case of compact projections systems, the edges (E) can encroach on the main projected cone of light so that the exit aperture functions as a half-slit and thereby introduces flare.

Figure 5:
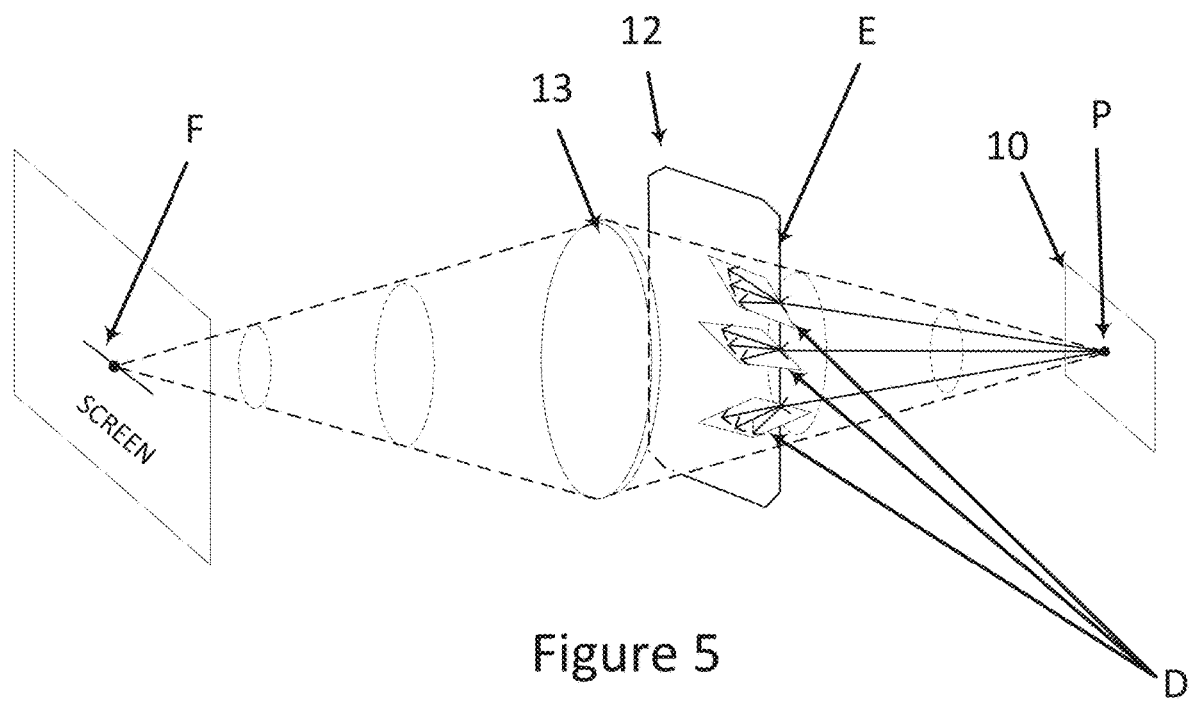
FIG. 5 shows the effect of the straight-edge aperture of FIG. 4 acting on a projected cone of light so as to create a flare artifact perpendicular to the aperture edge.

FIG. 5 shows how the effect of the straight-edge slit of aperture (12) acting on a projected cone of light from a single pixel (P) causes diffraction perpendicular to the straight edge (E), which when focused by the projection lens (13) appears as light extending from the side(s) of the pixel (i.e. flare (F)) perpendicular to the edge. As shown schematically in FIG. 5, light rays are diffracted (D) perpendicular to the edge (E), as shown at (F) appearing to come from either side of the projected pixel.

Figure 6:
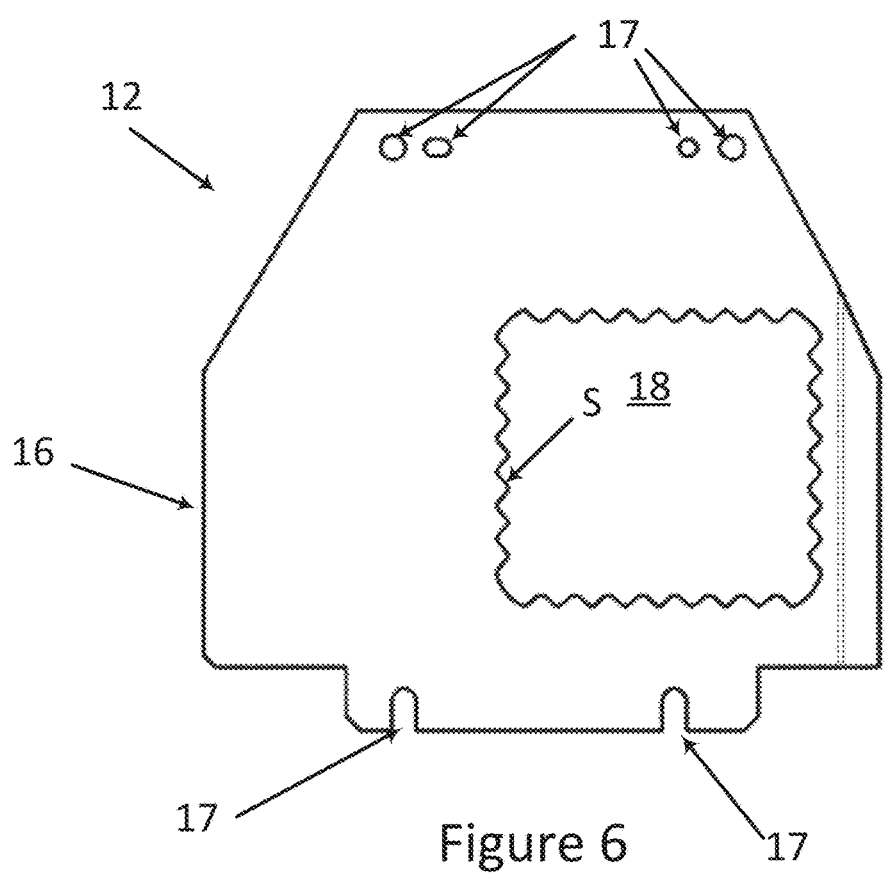
FIG. 6 depicts a serrated-edge exit aperture according to an embodiment.

According to an aspect of the invention, an improved exit aperture (18) is provided, as shown in FIG. 6, where like reference numerals are used to depict similar features to the aperture (12). The aperture (18) has a frame (16) with mounting points (17) and generally rectangular opening (18), where the frame is preferably opaque and can, for example, be fabricated from sheet metal. However, unlike the prior art aperture (12), straight edges (E) are replaced by serrated edges (S), thereby allowing the aperture to be positioned similar to aperture (12) so as to block the prism internal slit-edge diffraction due to intersections (14a), (14b) and (14c) while also preventing the addition of flare resulting from the aperture edge itself.

Figure 7:
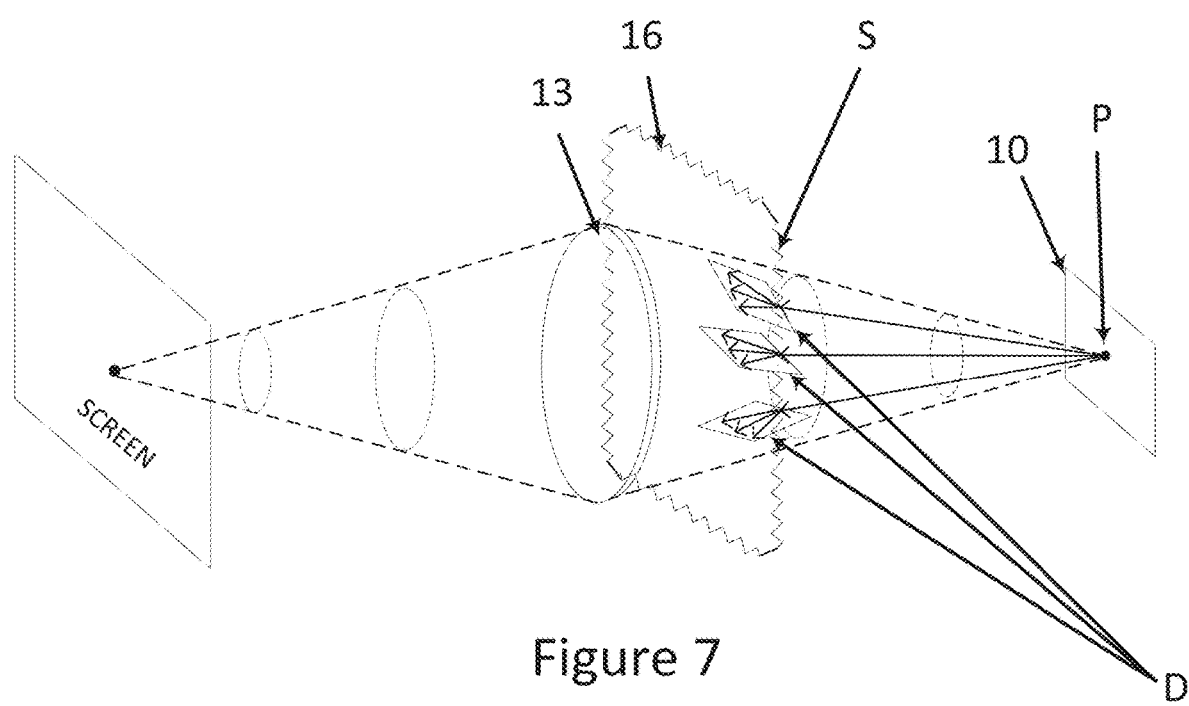
FIG. 7 depicts a portion of the serrated-edge exit aperture of FIG. 6, showing diffraction of the cone of light at numerous angles.

As shown in FIG. 7, the serrated-edge aperture (S) creates diffraction of the cone of light perpendicular to the serrated edge at a very wide range of angles, which when focused by the projection lens avoids concentrating light in a single line such that flare occurs at every angle and can no longer be perceived.

The present invention has been described with respect to the use of an aperture with a serrated inner circumference in a projection system that uses a narrow, compact prism (5). However, a person of skill in the art will understand that the aperture with serrated inner circumference set forth herein can be used in projection systems that use conventional prisms in order to block undesired outside-the-main-light-cone artifacts.

The many features and advantages of the invention are apparent from the detailed specification and, thus, it is intended by the appended claims to cover all such features and advantages of the invention that fall within the scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An exit aperture for placement between a prism and a projection lens capable of projecting light on a screen, the exit aperture comprising a frame with an opening for passing a cone of light and mounting points for securing the frame relative to the projection lens, wherein the opening has serrated edges for diffracting light incident thereon in multiple directions perpendicular to the serrated edges so as to be imperceptible when projected on said screen.

2. The exit aperture of claim 1, wherein the frame is opaque for blocking stray light.

3. The exit aperture of claim 1, wherein the frame is fabricated from sheet metal.

* * * * *